US 6,570,638 B2

(12) United States Patent  (10) Patent No.: US 6,570,638 B2
Song  (45) Date of Patent: May 27, 2003

(54) LIQUID CRYSTAL DISPLAY INCLUDING PIXEL ELECTRODES WITH PLURALITY OF OPENINGS

(75) Inventor: Jang-Kun Song, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 105 days.

(21) Appl. No.: 09/804,052

(22) Filed: Mar. 13, 2001

(65) Prior Publication Data

US 2001/0024246 A1 Sep. 27, 2001

(30) Foreign Application Priority Data

Mar. 13, 2000 (KR) ......................................... 2000-12485

(51) Int. Cl.[7] ....................... G02F 1/1343; G02F 1/1337
(52) U.S. Cl. ....................... 349/143; 349/38; 349/129; 349/141; 349/144
(58) Field of Search ........................... 349/38, 42, 129, 349/143, 144, 141

(56) References Cited

U.S. PATENT DOCUMENTS

| 5,309,264 | A | * | 5/1994 | Lien et al. .................... 349/130 |
| 5,646,705 | A | * | 7/1997 | Higuchi et al. ............... 349/126 |
| 6,100,953 | A | * | 8/2000 | Kim et al. .................... 349/122 |
| 6,285,429 | B1 | * | 9/2001 | Nishida et al. ............... 349/118 |
| 6,285,431 | B2 | * | 9/2001 | Lyu et al. .................... 349/129 |
| 6,288,763 | B1 | * | 5/2002 | Hirota ......................... 349/141 |
| 6,424,398 | B1 | * | 7/2002 | Taniguchi .................... 349/143 |
| 2002/0054265 | A1 | * | 12/2001 | Song et al. .................. 349/143 |

* cited by examiner

*Primary Examiner*—Tarifur R. Chowdhury
(74) *Attorney, Agent, or Firm*—McGuireWoods LLP; Hae-Chan Park

(57) ABSTRACT

Disclosed is a thin film transistor panel comprising an insulation panel; gate wiring formed on the insulation panel; data wiring insulated from and intersecting the gate wiring; a switching element connected to the gate wiring and the data wiring, the switching element transmitting or cutting off signals of the data wiring according to signals of the gate wiring; and a pixel electrode connected to the switching element to receive the signals from the data wiring, the pixel electrode having an opening pattern, wherein the opening pattern of the pixel electrode includes a plurality of openings, each opening making a predetermined angle with an adjacent opening. Also disclosed is a liquid crystal display comprising a thin film transistor panel as described above; an opposing panel provided at a predetermined distance from the thin film transistor panel; a color filter formed on the opposing panel; a black matrix formed on the opposing panel; a common electrode formed over the color filter and the black matrix; liquid crystal material injected between the thin film transistor panel and the opposing panel; and first and second polarizing films respectively provided on the thin film transistor panel and the opposing panel.

16 Claims, 5 Drawing Sheets

LIQUID CRYSTAL DISPLAY INCLUDING PIXEL ELECTRODES WITH PLURALITY OF OPENINGS

BACKGROUND OF THE INVENTION (a) Field of the Invention

The present invention relates to a liquid crystal display and a TFT panel applied thereto. More particularly, the present invention relates to a vertically-aligned liquid crystal display and a TFT panel applied thereto, the liquid crystal display having pixel electrodes on which there are formed an aperture pattern and protrusions.

(b) Description of the Related Art

Liquid crystal displays (LCDs) typically include a first substrate on which are formed common electrodes and a color filter, and a second substrate on which are formed thin film transistors (TFTs) and pixel electrodes. The first and second substrates are provided substantially in parallel with a predetermined gap therebetween. Liquid crystal material is injected between the two opposing substrates. An electric field is formed between the substrates by applying different voltages to the pixel electrodes and common electrodes. Accordingly, the alignment of liquid crystal molecules changes, controlling the transmittance of incident light.

In such conventional LCDs, a limited viewing angle is a serious drawback. Among the different methods of providing a wider viewing angle, an increasingly common method is that of aligning the liquid crystal molecules vertically to the two substrates and forming an aperture pattern in the pixel electrodes and the common electrodes. The aperture patterns in the pixel electrodes and common electrodes formed respectively on the second substrate and first substrate generate a fringe field. The fringe field is used to control the alignment direction of the liquid crystal molecules in order to increase the viewing angle.

However, such a configuration makes it more complicated to manufacture the LCD, since the common electrodes formed on the color filter and made of ITO (indium tin oxide), need to be patterned using a photolithography process. Also, because the adhesion between the ITO, which is deposited on the color filter by a sputtering process, and a color filter resin is not strong, the photolithography process cannot be performed precisely on the common electrodes.

In addition, when etching the ITO, the color filter becomes exposed and may be damaged. To prevent this problem, an organic insulation layer (overcoat layer) must be coated on the color filter. Putting this overcoat layer is expensive. Further, with the formation of the overcoat layer, since the common electrodes do not directly contact a black matrix (made of chrome), the increased resistance increases the chance of a flicker defect. Finally, a resistance of the common electrodes is increased by forming an aperture pattern in the common electrodes.

SUMMARY OF THE INVENTION

The present invention has been made in an effort to solve the above problems.

It is an object of the present invention to provide a simple method for manufacturing a wide viewing angle liquid crystal display and a TFT panel applied thereto.

To achieve the above object, the present invention provides a thin film transistor panel comprising an insulation panel; gate wiring formed on the insulation panel; data wiring insulated from and intersecting the gate wiring; a switching element connected to the gate wiring and the data wiring, the switching element transmitting or cutting off signals of the data wiring according to signals of the gate wiring; and a pixel electrode connected to the switching element to receive the transmitted signals of the data wiring, the pixel electrode having an opening pattern, wherein the opening pattern of the pixel electrode includes a plurality of openings, each opening making a predetermined angle with an adjacent opening.

In another aspect, the present invention provides a thin film transistor panel applied to a liquid crystal display comprising an insulation panel; gate wiring formed on the insulation panel; data wiring insulated from and intersecting the gate wiring; a switching element connected to the gate wiring and the data wiring, the switching element transmitting or cutting off signals of the data wiring according to signals of the gate wiring; and a pixel electrode connected to the switching element to receive the transmitted signals of the data wiring, the pixel electrode having an opening pattern, wherein the opening pattern of the pixel electrode includes a plurality of openings, each opening being splayed.

In yet another aspect, the present invention provides a thin film transistor panel applied to a liquid crystal display comprising an insulation panel; gate wiring formed on the insulation panel; data wiring insulated from the gate wiring and intersecting the gate wiring; a switching element connected to the gate wiring and the data wiring, the switching element transmitting or cutting off signals of the data wiring according to signals of the gate wiring; and a pixel electrode connected to the switching element to receive the transmitted signals of the data wiring, the pixel electrode having an opening pattern, wherein the opening pattern of the pixel electrode includes a plurality of openings, a distance of adjacent openings being different at ends of the openings.

According to a feature of the present invention, if a length of the pixel electrode is divided in half, an average direction of the openings formed on the pixel electrode on one half of the pixel electrode is from 80° to 100° to an average direction of the openings on the other half of the pixel electrode.

According to another feature of the present invention, the TFT panel further comprises storage electrode wiring having branch electrodes formed substantially corresponding to the openings.

According to yet another feature of the present invention, a width of the branch electrodes of the storage electrode wiring is between 2 and 10 $\mu$m.

According to still yet another feature of the present invention, a width of the openings is between 3 and 10 $\mu$m.

According to still yet another feature of the present invention, a width of the openings is between 10 and 20 $\mu$m.

According to still yet another feature of the present invention, an angle between two adjacent openings is between 5° and 40°.

The present invention also provides a liquid crystal display comprising a thin film transistor panel as described above; an opposing panel provided at a predetermined distance from the thin film transistor panel; a color filter formed on the opposing panel; a black matrix formed on the opposing panel; a common electrode formed over the color filter and the black matrix; liquid crystal material injected between the thin film transistor panel and the opposing panel; and first and second polarizing films respectively provided on the thin film transistor panel and the opposing panel.

According to a feature of the present invention, a polarizing direction of the first and second polarizing films is either perpendicular or parallel to an average direction of the openings of the pixel electrode.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
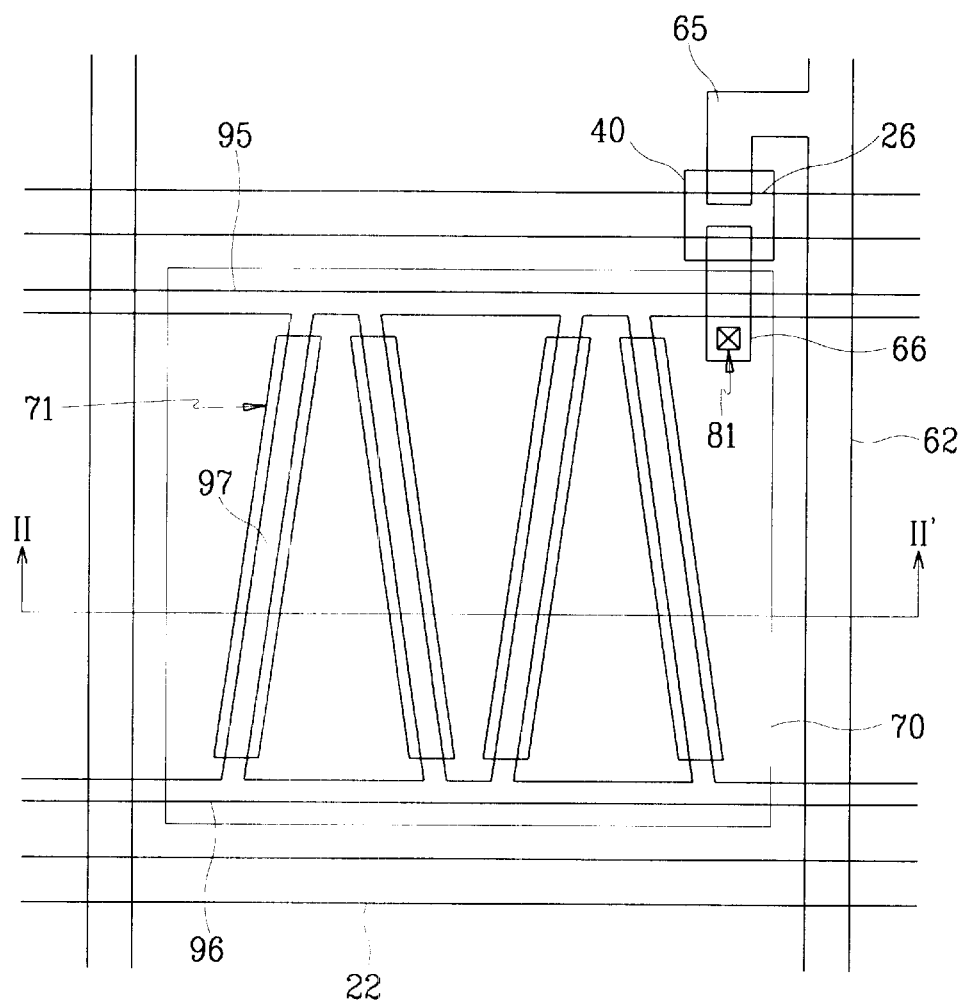
FIG. 1 is a schematic plan view of a TFT panel used in a liquid crystal display according to a first preferred embodiment of the present invention.
Figure 2:
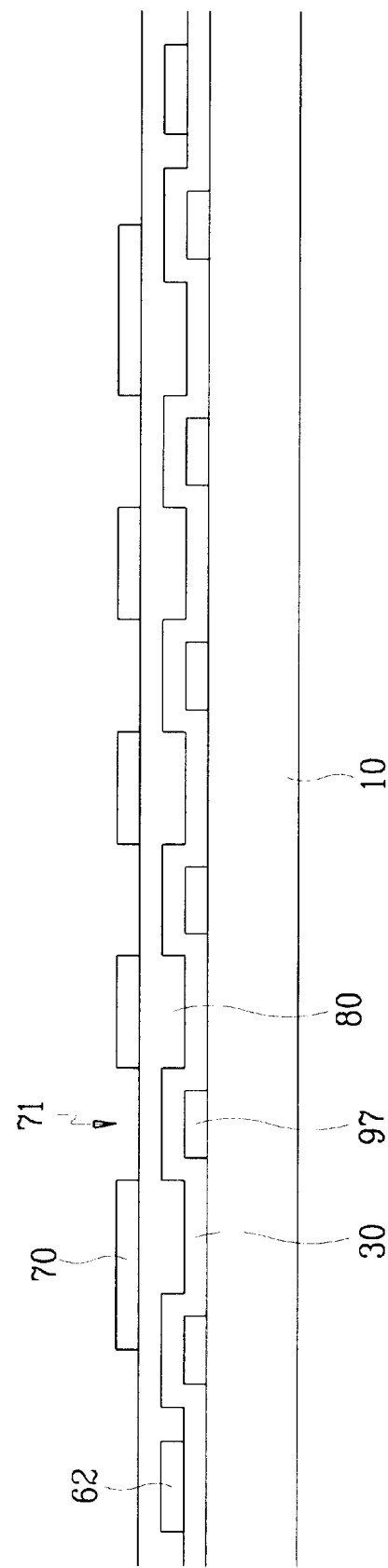
FIG. 2 is a sectional view taken along line II–II' of FIG. 1.

FIG. 1 shows a schematic plan view of a TFT panel used in a liquid crystal display according to a first preferred embodiment of the present invention. FIG. 2 shows a sectional view taken along line II–II' of FIG. 1. In FIG. 1, a single pixel region is shown and it is assumed that each pixel region of the TFT panel has the same configuration.

Formed on an insulation panel 10 are gate wiring, which is made of aluminum or an aluminum alloy, and storage electrode wiring. The gate wiring includes gate lines 22 extended horizontally (in FIG. 1) and a gate electrode 26. The storage electrode wiring includes storage electrode lines 95 and 96 extended horizontally (in FIG. 1), and a plurality of storage electrodes 97 provided between the storage electrode lines 95 and 96 to connect them. The storage electrodes 97 are not extended in parallel between the storage electrode lines 95 and 96. Instead, the storage electrodes 97 are slanted such that the storage electrodes 97 are splayed at the storage electrode line 96, thereby making the distances between the storage electrodes 97 different at the storage electrode line 95 from at the storage electrode line 96.

A gate insulation layer 30 is formed on top of the gate wiring and storage electrode wiring, and a semiconductor layer 40 is formed over the gate insulation layer 30, the semiconductor layer 40 forming data wiring and a TFT channel portion. The data wiring includes data lines 62 formed vertically (in FIG. 1), a source electrode 65 branched from the data lines 62, and a drain electrode 66 provided opposing the source electrode 65. An ohmic contact layer (not shown) is formed under the source electrode 65 and the drain electrode 66.

A passivation layer 80 having a contact hole 81 is formed on the data wiring, and a pixel electrode 70 having opening portions 71 is formed on the passivation layer 80. The opening portions 71 are formed diagonally, corresponding to the storage electrodes 97. Accordingly, the movement of the liquid crystal molecules is stable and a slanting direction of the liquid crystal molecules is fixed such that a texture is stably formed in a center of a domain. That is, since movement of the texture is prevented, the problems of poor picture quality and response speed as a result of texture do not occur.

Figure 3:
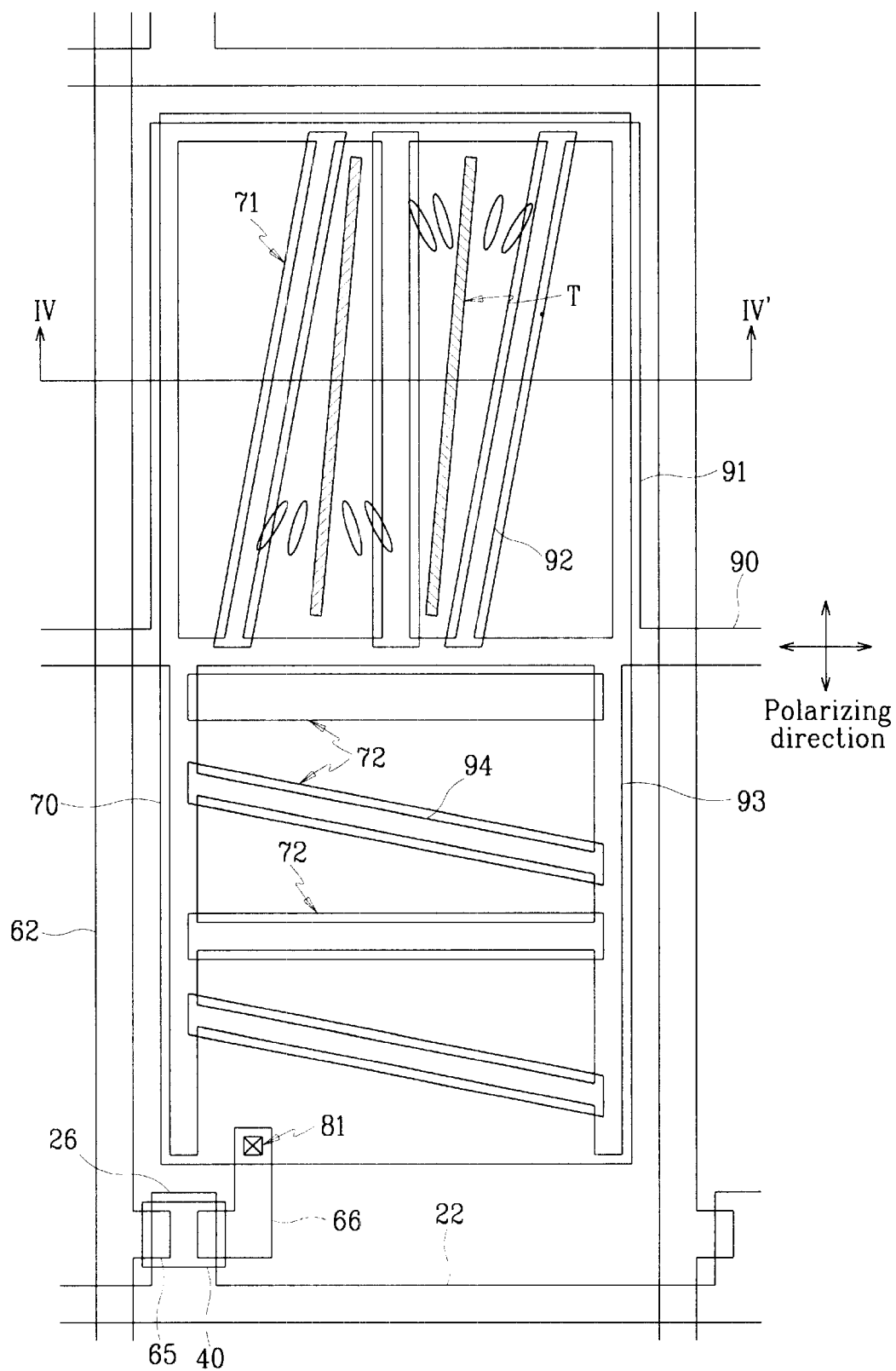
FIG. 3 is a schematic plan view of a liquid crystal display according to a second preferred embodiment of the present invention.
Figure 4:
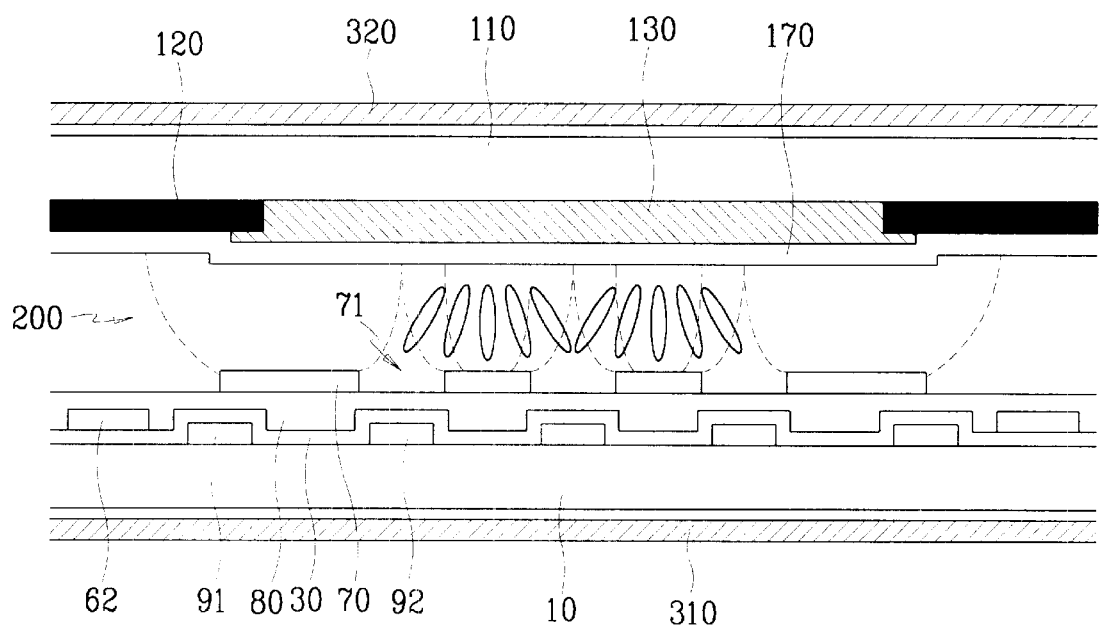
FIG. 4 is a sectional view taken along line IV–IV' of FIG. 3.

FIG. 3 shows a schematic plan view of a liquid crystal display according to a second preferred embodiment of the present invention. FIG. 4 is a sectional view taken along line IV–IV' of FIG. 3.

Formed on an insulation panel 10, or lower substrate, are gate wiring, which is made of aluminum or an aluminum alloy, and storage electrode wiring. The gate wiring includes gate lines 22 extended horizontally (in FIG. 3) and a gate electrode 26. The storage electrode wiring includes storage electrode lines 90 extended horizontally (in FIG. 3), and a plurality of storage electrodes 91, 92, 93 and 94. The storage electrodes 91 and 93 are hereinafter referred to as border electrodes, and the storage electrodes 92 and 94 are hereinafter referred to as branch electrodes. The branch electrodes 94 are not uniformly extended between the border electrodes 93, and instead are arranged at predetermined angles to one another to form a zigzag pattern. Also, the branch electrodes 92 are not uniformly extended between the border electrode 91 and the corresponding storage electrode line 90. Instead, branch electrodes 92 are arranged at predetermined angles to one another to form a zigzag pattern. In each region where the branch electrodes 92 and 94 are formed, the outermost branch electrodes 92 and 94 are arranged to form a parallelogram with the elements that ends of the branch electrodes 92 and 94 contact. A width of the elements of the storage electrode wiring is between 2 and 10 μm.

The elements of the gate wiring and the storage electrode wiring can be formed on a single layer or on multiple layers. When formed on a single layer, these elements can be made of aluminum or an aluminum-neodymium alloy; and when formed on a double layer, a lower layer can be made of an aluminum-neodymium alloy, and an upper layer can be made of a molybdenum-tungsten alloy. Further, it is possible to omit the elements of the storage electrode wiring.

A gate insulation layer 30 of $SiN_x$ is formed on top of the gate wiring and the storage electrode wiring, and a semiconductor layer 40 made of a hydrogen amorphous silicon semiconductor is formed over the gate insulation layer 30. The semiconductor layer 40 is stacked on top of the gate electrode 26. Formed on the semiconductor layer 40 is a contact layer (not shown), which is made of an n+ hydrogen amorphous silicon material that is doped at a high concentration with an n-type impurity. The contact layer is divided in two parts about a center of the gate electrode 26.

Data wiring made of chrome or a molybdenum-tungsten alloy is formed over the contact layer. The data wiring includes a data line 62 formed vertically (in FIG. 3), a source electrode 65 branched from the data line 62, and a drain electrode 66 formed opposing the source electrode 65. The elements of the data wiring can be formed on a single layer or on multiple layers. When formed on more than one layer, one layer is made of a material of low resistance and the remaining layers are made of materials having good contact properties with other materials.

The gate wiring, storage electrode wiring, gate insulation layer 30, semiconductor layer 40, contact layer, and data wiring described above can be provided in different configurations than that described above. For example, the elements of the gate wiring can be formed in a ring-shaped gate structure. Also, it is possible to omit the elements of the storage electrode wiring, the contact layer can be formed in a pattern identical to the data wiring, and the semiconductor layer 40 can be formed following the pattern of the data wiring. Further, a passivation layer 80 made of an inorganic insulation material such as SiN$_x$ is formed on the data wiring. A contact hole 81 exposing the drain electrode 66 is formed in the passivation layer 80.

A thin film transistor is formed of the gate electrode 26, source electrode 65, drain electrode 66, semiconductor layer 40, and contact layer as described above. The thin film transistor acts as a switching element to either transmit or cut off an image signal transmitted via the data wiring to a pixel electrode 70 (to be described hereinafter) according to a scanning signal transmitted via the gate wiring.

The passivation layer 80 covers at least a channel portion between the source electrode 65 and the drain electrode 66. The pixel electrode 70 is made of a clear conductive material such as ITO (indium tin oxide) or IZO (indium zinc oxide), and is provided over the passivation layer 80. Accordingly, the pixel electrode 70 contacts the exposed drain electrode 66. In the case of a reflective liquid crystal display, a non-transparent material can be used for the pixel electrode 70.

Openings 71 and 72 are formed in the pixel electrode 70. The openings 71 and 72 correspond to the formation of the branch electrodes 92 and 94, respectively, to thereby be formed in a zigzag pattern. A width of the openings 71 and 72 is between 3 and 10 μm. When the storage electrode wiring is not formed, the width of the openings 71 and 72 is increased to between 10 and 20 μm. The storage electrode wiring generates an electric field in the space between the elements of the same and the pixel electrode 70 to provide a storage capacity, and enhances a fringe field formed by the openings 71 and 72.

Formed on an upper panel 110 are a black matrix 120 and a color filter 130. A common electrode 170 made of a clear conductive material such as ITO and IZO is formed over the black matrix 120 and the color filter 130. Openings are not formed in the common electrode 170.

A liquid crystal material 200 is injected between the upper substrate 110 and the lower substrate 10, and polarizing films 310 and 320 are adhered respectively to outer surfaces of the lower substrate 10 and the upper substrate 110. A polarizing direction of the polarizing films 310 and 320 is either perpendicular or parallel to an average direction of the openings 71 and 72.

The electric field generated between the pixel electrode 70 and common electrode 170 by the openings 71 and 72 of the pixel electrode 70 is curved in a predetermined pattern as shown by the dotted lines of FIG. 4. Accordingly, a direction at which liquid crystal molecules of the liquid crystal material 200 slant is controlled.

That is, a plurality of domains is formed in each pixel region by the openings 71 and 72.

With the formation of the openings 71 and 72 only in the pixel electrode 70 as described above, a texture T is generated as shown in FIG. 3. In the present invention, since the opening portions 71 and 72 are formed at an angle to one another, the movement of the liquid crystal molecules is stable and the slanting direction of the liquid crystal molecules is fixed such that the texture T is stably formed in a center of a domain. That is, since the texture T is prevented from moving, the problems of poor picture quality and response speed as a result of texture do not occur.

Figure 5:
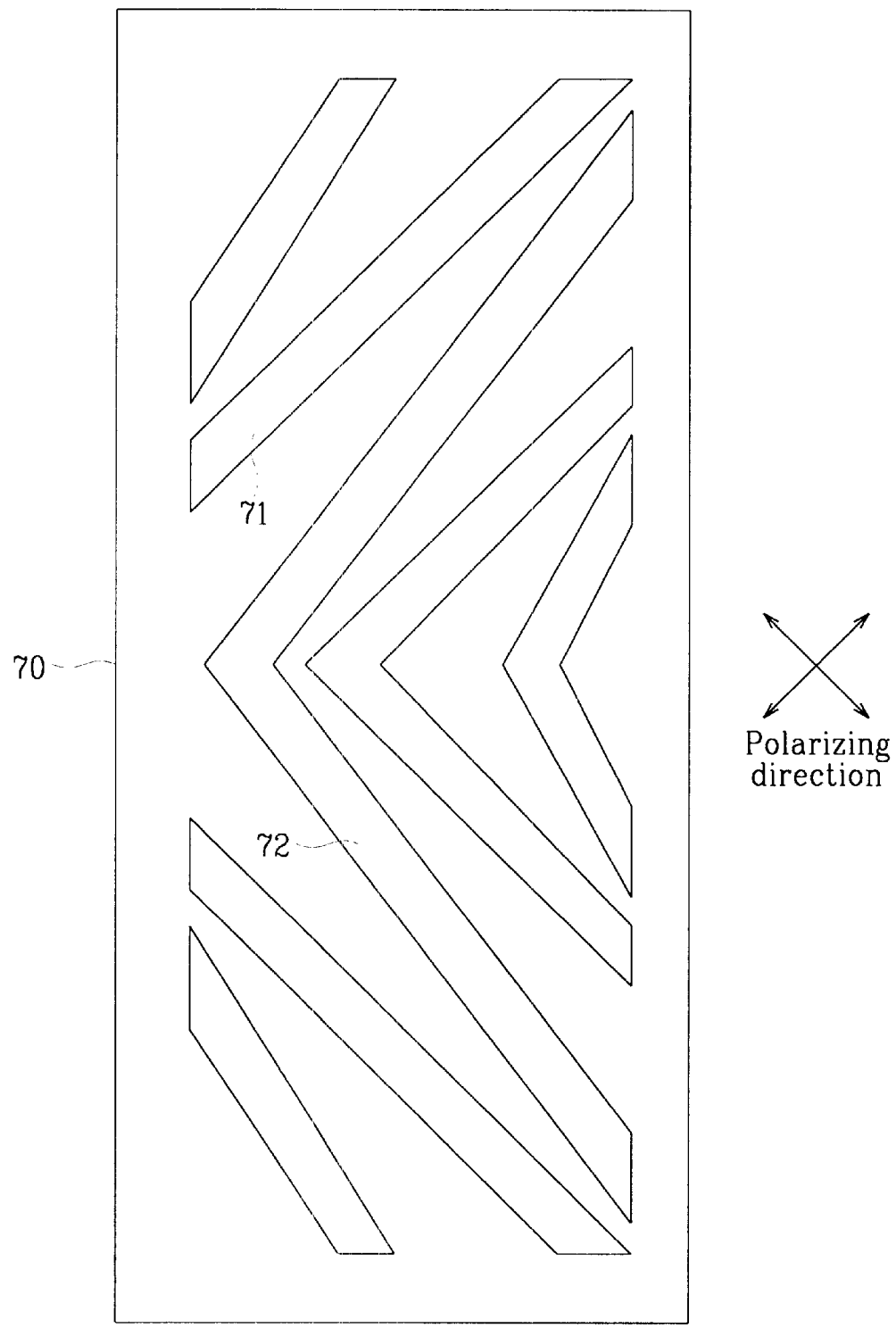
FIG. 5 is a schematic plan view of an opening pattern formed on a pixel electrode according to a third preferred embodiment of the present invention.

FIG. 5 shows a schematic plan view of an opening pattern formed on the pixel electrode 70 according to a third preferred embodiment of the present invention.

As shown in the drawing, openings 71 and 72 are formed in a predetermined pattern. Also, if a length of the pixel electrode 70 is divided in half, an average direction of the openings 71 and 72 on one half of the pixel electrode 70 is roughly perpendicular (80° to 100°) to an average direction of the openings 71 and 72 on the other half of the pixel electrode 70. Such patterning of the openings 71 and 72 evenly disperses the slanting of the liquid crystal molecules in four directions.

In the TFT panel of the present invention described above, a wide viewing angle can be obtained in the LCD without additional manufacturing processes as required in conventional VA-TFTs. Also, since the common electrode of the upper substrate does not require patterning, such problems such as an increased common electrode voltage or the need for an overcoat layer can be eliminated.

Although preferred embodiments of the present invention have been described in detail hereinabove, it should be clearly understood that many variations and/or modifications of the basic inventive concepts herein taught that may appear to those skilled in the present art will still fall within the spirit and scope of the present invention, as defined in the appended claims.

What is claimed is:

1. A thin film transistor panel, comprising:

an insulation panel;

gate wiring formed on the insulation panel;

data wiring insulated from and intersecting the gate wiring;

a switching element connected to the gate wiring and the data wiring, the switching element transmitting or cutting off signals of the data wiring according to signals of the gate wiring; and a pixel electrode connected to the switching element to receive the signals from the data wiring, the pixel electrode having an opening pattern, wherein the opening pattern of the pixel electrode includes a plurality of openings, each opening making a predetermined angle with an adjacent opening, and if a length of the pixel electrode is divided in half, an average direction of the openings formed on the pixel electrode on one half of the pixel electrode is from 80° to 100° to an average direction of the openings on the other half of the pixel electrode.

2. The thin film transistor panel of claim 1, further comprising storage electrode wiring having branch electrodes formed substantially corresponding to the openings.

3. The thin film transistor panel according to claim 2, wherein a width of the branch electrodes of the storage electrode wiring is between 2 and 10 μm.

4. The thin film transistor panel of claim 3, wherein a width of the openings is between 3 and 10 μm.

5. The thin film transistor panel of claim 1, wherein a width of the openings is between 10 and 20 μm.

6. A thin film transistor panel, comprising:

an insulation panel;

gate wiring formed on the insulation panel;

data wiring insulated from and intersecting the gate wiring;

a switching element connected to the gate wiring and the data wiring, the switching element transmitting or cutting off signals of the data wiring according to signals of the gate wiring; and a pixel electrode connected to the switching element to receive the signals from the data wiring, the pixel electrode having an opening pattern, wherein the opening pattern of the pixel electrode includes a plurality of openings, each opening making an angle between 5° and 40° with an adjacent opening.

7. A thin film transistor panel for a liquid crystal display, comprising:

an insulation panel;

gate wiring formed on the insulation panel;

data wiring insulated from and intersecting the gate wiring;

a switching element connected to the gate wiring and the data wiring, the switching element transmitting or cutting off signals of the data wiring according to signals of the gate wiring; and a pixel electrode connected to the switching element to receive the signals from the data wiring, the pixel electrode having an opening pattern, wherein the opening pattern of the pixel electrode includes a plurality of openings, each opening being splayed, and if a length of the pixel electrode is divided in half, an average direction of the openings formed on the pixel electrode on one half of the pixel electrode is from 80° to 100° to an average direction of the openings on the other half of the pixel electrode.

8. The thin film transistor panel of claim 7, wherein a width of the openings is between 10 and 20 μm.

9. A liquid crystal display, comprising:

a thin film transistor panel of claim 7, an opposing panel provided at a predetermined distance from the thin film transistor panel;

a color filter formed on the opposing panel;

a black matrix formed on the opposing panel;

a common electrode formed over the color filter and the black matrix;

liquid crystal injected between the thin film transistor panel and the opposing panel; and a first polarizing film and a second polarizing film respectively provided on the thin film transistor panel and the opposing panel, wherein polarizing directions of the first polarizing film and the second polarizing film are either perpendicular or parallel to an average direction of the openings of the pixel electrode.

10. A thin film transistor panel for a liquid crystal display, comprising:

an insulation panel;

gate wiring formed on the insulation panel;

data wiring insulated from and intersecting the gate wiring;

a switching element connected to the gate wiring and the data wiring, the switching element transmitting or cutting off signals of the data wiring according to signals of the gate wiring; and a pixel electrode connected to the switching element to receive the signals from the data wiring, the pixel electrode having an opening pattern, wherein the opening pattern of the pixel electrode includes a plurality of openings, each opening being splayed, and an angle between two adjacent openings is between 5° and 40°.

11. A thin film transistor panel for a liquid crystal display, comprising:

an insulation panel;

gate wiring formed on the insulation panel;

data wiring insulated from the gate wiring and intersecting the gate wiring;

a switching element connected to the gate wiring and the data wiring, the switching element transmitting or cutting off signals of the data wiring according to signals of the gate wiring; and a pixel electrode connected to the switching element to receive the signals of the data wiring, the pixel electrode having an opening pattern, wherein the opening pattern of the pixel electrode includes a plurality of openings, a distance between adjacent openings being different at each end of the openings, and if a length of the pixel electrode is divided in half, an average direction of the openings formed on the pixel electrode on one half of the pixel electrode is from 80° to 100° to an average direction of the openings on the other half of the pixel electrode.

12. The thin film transistor panel of claim 11, further comprising storage electrode wiring having branch electrodes formed substantially corresponding to the openings.

13. The thin film transistor panel of claim 12, wherein a width of the branch electrodes of the storage electrode wiring is between 2 and 10 μm.

14. The thin film transistor panel of claim 13, wherein a width of the openings is between 3 and 10 μm.

15. The thin film transistor panel of claim 11, wherein a width of the openings is between 10 and 20 μm.

16. A thin film transistor panel for a liquid crystal display, comprising:

an insulation panel;

gate wiring formed on the insulation panel;

data wiring insulated from the gate wiring and intersecting the gate wiring;

a switching element connected to the gate wiring and the data wiring, the switching element transmitting or cutting off signals of the data wiring according to signals of the gate wiring; and a pixel electrode connected to the switching element to receive the signals of the data wiring, the pixel electrode having an opening pattern, wherein the opening pattern of the pixel electrode includes a plurality of openings, a distance between adjacent openings being different at each end of the openings, and an angle between two adjacent openings is between 5° and 40°.

* * * * *

UNITED STATES PATENT AND TRADEMARK OFFICE
CERTIFICATE OF CORRECTION

PATENT NO. : 6,570,638 B2  
DATED : May 27, 2003  
INVENTOR(S) : Jang-Kun Song

It is certified that error appears in the above-identified patent and that said Letters Patent is hereby corrected as shown below:

<u>Title page, Item [54] Column 1, lines 1-3,</u>  
Change "LIQUID CRYSTAL DISPLAY INCLUDING PIXEL ELECTRODES WITH PLURALITY OF OPENINGS" to -- LIQUID CRYSTAL DISPLAY HAVING AN OPENING OF ELECTRODE --

Signed and Sealed this

Twenty-third Day of September, 2003

JAMES E. ROGAN  
*Director of the United States Patent and Trademark Office*